United States Patent
Malley et al.

(10) Patent No.: US 11,113,055 B2
(45) Date of Patent: Sep. 7, 2021

(54) STORE INSTRUCTION TO STORE INSTRUCTION DEPENDENCY

(71) Applicant: INTERNATIONAL BUSINESS MACHINES CORPORATION, Armonk, NY (US)

(72) Inventors: Edward Malley, New Rochelle, NY (US); Jang-Soo Lee, Poughkeepsie, NY (US); Anthony Saporito, Highland, NY (US); Chung-Lung K. Shum, Wappingers Falls, NY (US); Gregory William Alexander, Pflugerville, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/357,380

(22) Filed: Mar. 19, 2019

(65) Prior Publication Data
US 2020/0301706 A1    Sep. 24, 2020

(51) Int. Cl.
*G06F 9/30* (2018.01)
*G06F 9/38* (2018.01)

(52) U.S. Cl.
CPC ...... *G06F 9/30043* (2013.01); *G06F 9/30101* (2013.01); *G06F 9/3851* (2013.01); *G06F 9/3869* (2013.01)

(58) Field of Classification Search
None
See application file for complete search history.

(56) References Cited

U.S. PATENT DOCUMENTS

| 5,099,416 A | | 3/1992 | Tanaka et al. | |
|---|---|---|---|---|
| 5,931,957 A | * | 8/1999 | Konigsburg | G06F 9/30043 712/216 |
| 6,065,103 A | * | 5/2000 | Tran | G06F 9/3834 711/117 |

(Continued)

FOREIGN PATENT DOCUMENTS

WO    9908185 A1    2/1999

OTHER PUBLICATIONS

G Reinman et al., "Classifying Load and Store Instructions for Memory Renaming," https://web.eecs.umich.edu/~taustin/papers/ICS99-ldmark.pdf. pp. 10.

*Primary Examiner* — Steven G Snyder
(74) *Attorney, Agent, or Firm* — Cantor Colburn LLP; Margaret McNamara

(57) ABSTRACT

A computer implemented method for marking a store instruction overlap in a processor pipeline is provided. A non-limiting example of the method includes detecting a second store instruction subsequent to a first store instruction in an instruction stream, in which there is a match between the operand address information of the first store instruction and a load instruction. The operand address information of the first store instruction is compared with the operand address information of the second store instruction to determine whether there is match. In the event of a match, the second store instruction is delayed in the processor pipeline in response to determining that there is a memory image overlap between the operand address information of the second store instruction and the first store instruction.

17 Claims, 6 Drawing Sheets

(56) References Cited

U.S. PATENT DOCUMENTS

| | | | | |
|---|---|---|---|---|
| 6,108,770 A * | 8/2000 | Chrysos | G06F 9/30043 | 712/216 |
| 6,463,523 B1 * | 10/2002 | Kessler | G06F 9/3814 | 712/202 |
| 6,578,135 B1 * | 6/2003 | Dobberpuhl | G06F 9/30167 | 712/219 |
| 6,622,237 B1 * | 9/2003 | Keller | G06F 9/3834 | 712/214 |
| 6,694,424 B1 * | 2/2004 | Keller | G06F 9/3834 | 712/216 |
| 8,131,953 B2 * | 3/2012 | Robinson | G06F 9/3851 | 711/156 |
| 8,756,374 B2 * | 6/2014 | Cypher | G06F 12/0855 | 711/118 |
| 8,918,625 B1 * | 12/2014 | O'Bleness | G06F 9/3834 | 712/214 |
| 9,069,563 B2 * | 6/2015 | Konigsburg | G06F 9/3838 | |
| 9,128,725 B2 | 9/2015 | Meier et al. | | |
| 9,442,735 B1 * | 9/2016 | Jamil | G06F 9/3826 | |
| 9,600,289 B2 * | 3/2017 | Meier | G06F 9/3834 | |
| 9,697,132 B2 | 7/2017 | Alexander et al. | | |
| 9,965,277 B2 | 5/2018 | Abdallah | | |
| 10,048,964 B2 | 8/2018 | Abdallah | | |
| 10,296,348 B2 * | 5/2019 | Alexander | G06F 9/3836 | |
| 10,877,755 B2 * | 12/2020 | Schlanger | G06F 9/30021 | |
| 2003/0120883 A1 * | 6/2003 | Farrall | G06F 9/3814 | 711/169 |
| 2004/0059898 A1 * | 3/2004 | Baxter | G06F 9/3836 | 712/235 |
| 2006/0129764 A1 * | 6/2006 | Bellows | G06F 13/1631 | 711/125 |
| 2006/0179226 A1 * | 8/2006 | Guthrie | G06F 9/30043 | 711/125 |
| 2008/0082765 A1 * | 4/2008 | Hily | G06F 9/3824 | 711/154 |
| 2008/0086623 A1 * | 4/2008 | Lien | G06F 9/3842 | 712/218 |
| 2009/0157943 A1 * | 6/2009 | Robinson | G06F 12/0875 | 711/100 |
| 2009/0157944 A1 * | 6/2009 | Robinson | G06F 9/3834 | 711/100 |
| 2009/0210675 A1 * | 8/2009 | Alexander | G06F 9/3836 | 712/216 |
| 2010/0125707 A1 * | 5/2010 | Cypher | G06F 9/3824 | 711/145 |
| 2010/0153655 A1 * | 6/2010 | Cypher | G06F 12/0855 | 711/139 |
| 2012/0117323 A1 * | 5/2012 | Cypher | G06F 9/3826 | 711/118 |
| 2013/0073833 A1 * | 3/2013 | Konigsburg | G06F 9/3838 | 712/205 |
| 2013/0339670 A1 * | 12/2013 | Busaba | G06F 9/3017 | 712/216 |
| 2014/0181482 A1 | 6/2014 | Smaus et al. | | |
| 2014/0244984 A1 * | 8/2014 | Kaplan | G06F 9/3826 | 712/225 |
| 2014/0325156 A1 | 10/2014 | Ardevol | | |
| 2016/0103682 A1 * | 4/2016 | Alexander | G06F 9/3851 | 711/125 |
| 2016/0179545 A1 * | 6/2016 | Garifullin | G06F 9/30181 | 712/205 |
| 2018/0081688 A1 | 3/2018 | Fei | | |
| 2018/0150395 A1 * | 5/2018 | Cordes | G06F 12/0897 | |
| 2018/0232234 A1 | 8/2018 | Alexander et al. | | |
| 2018/0253309 A1 * | 9/2018 | Stephens | G06F 9/3555 | |
| 2020/0065109 A1 * | 2/2020 | Shen | G06F 9/384 | |

\* cited by examiner

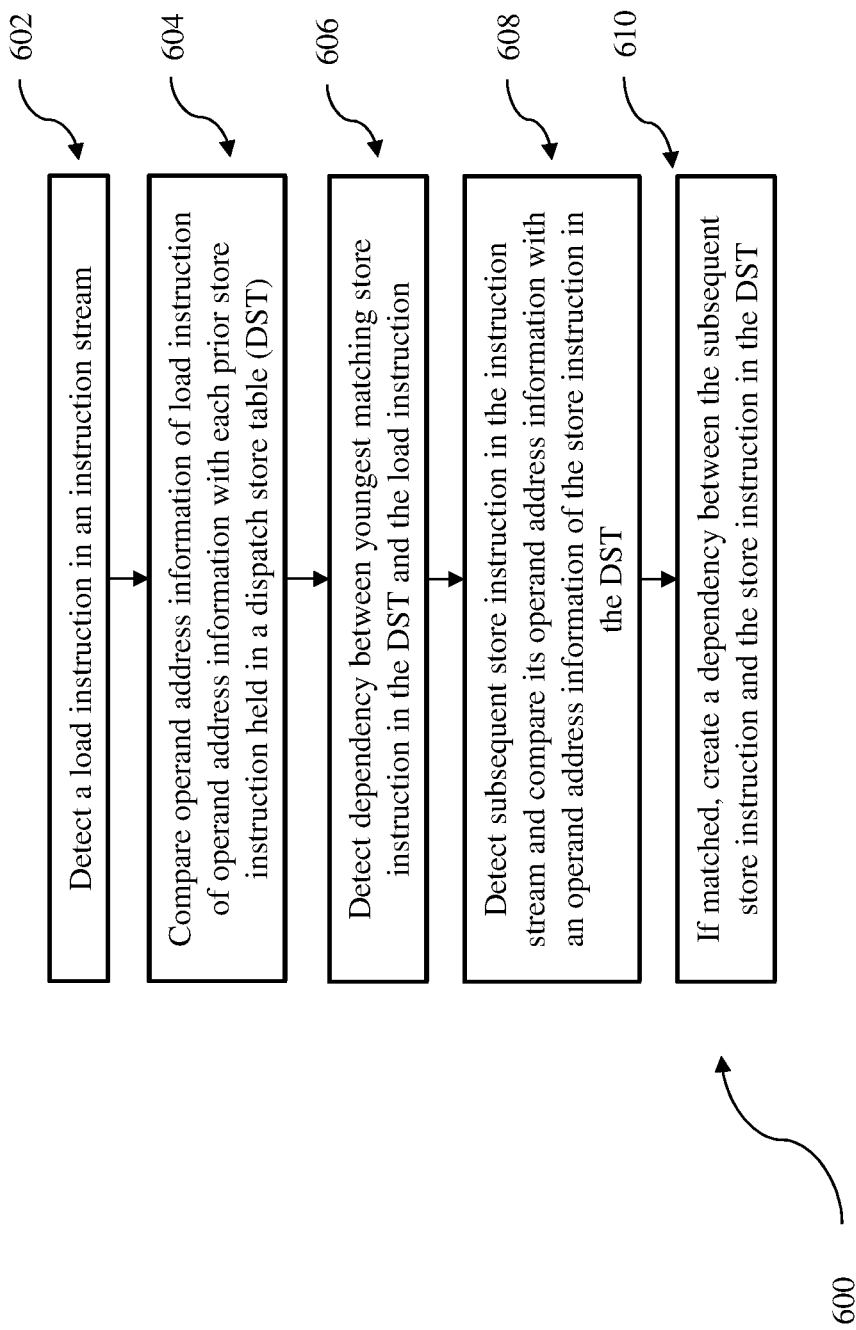

STORE INSTRUCTION TO STORE INSTRUCTION DEPENDENCY

BACKGROUND

The present invention generally relates to data processing, and more specifically, to creating a store instruction dependency in a processor pipeline.

In modern-day high-performance applications, programs often implement store and load instructions. A store instruction moves data from a register to system memory. A load instruction moves data from system memory to a register. In many instances, processors execute instruction streams, in which one or more store instructions precede a load instruction for data located at the same memory address. In these instances, to correctly execute the program, the load instruction must receive the store data produced by the newest preceding store instruction.

SUMMARY

Embodiments of the present invention are directed to a computer-implemented method for creating a store instruction dependency in a processor pipeline. A non-limiting example of the computer-implemented method includes detecting a second store instruction subsequent to a first store instruction in an instruction stream, in which there is a memory image overlap in an issue queue between the operand address information of the first store instruction and an operand address information of a load instruction. The operand address information of the first store instruction is compared with the operand address information of the second store instruction to determine whether there is a memory image overlap in an issue queue between the operand address information of the second store instruction and the first store instruction. In the event of a match, the second store instruction is delayed in the processor pipeline in response to determining that there is a memory image overlap between the operand address information of the second store instruction and the first store instruction.

Embodiments of the present invention are directed to a system for creating a store instruction dependency in a processor pipeline. The computer system includes a memory and a hardware processor system communicatively coupled to the memory. The processor system is configured to perform the computer-implemented method.

Embodiments of the invention are directed to a computer program product for a creating a store instruction dependency in a processor pipeline, the computer program product comprising a computer readable storage medium having program instructions embodied therewith. The computer product comprises a computer readable storage medium embodied with program instructions. The instructions are executable by a hardware processor, and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a flow diagram of a method for a store forwarding cache according to one or more embodiments of the invention.

Figure 1:
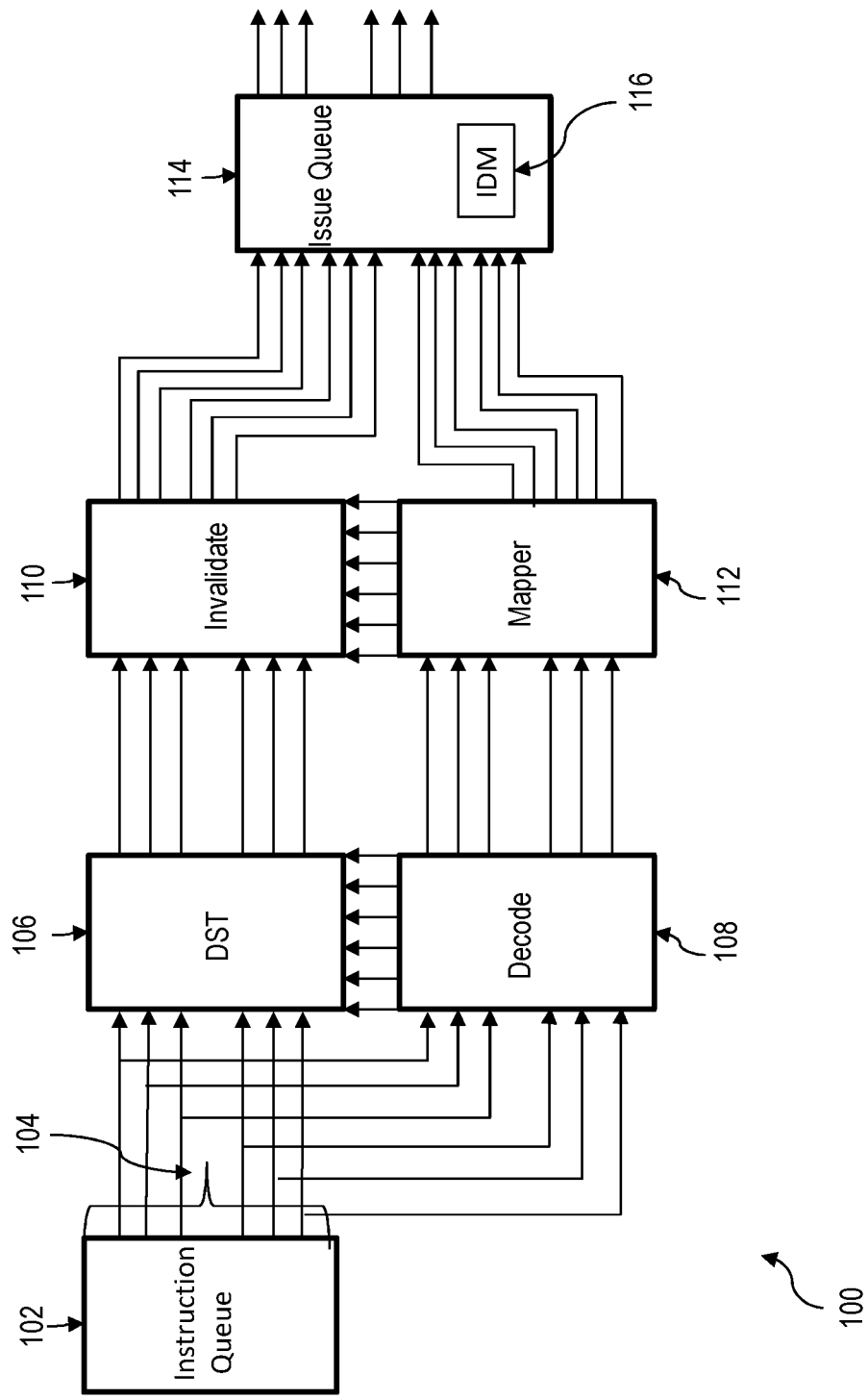
FIG. 1 depicts a block diagram of an instruction pipeline, according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Modern, high-performance out of order processor monitor dependencies between load and store instructions to both inhibit instances of data incoherence, latency, and ensuring that instructions are processing correctly. Dependency tracking can be done at or near dispatch time based on instruction text when it comes to register dependencies. If an instruction is dispatched to write to a register and a subsequent instruction is dispatched to read the register, a processor creates a dependency for the initial instruction to execute prior to the subsequent instruction.

Turning now to an overview of technologies that are more specifically relevant to aspects of the invention, a store forwarding cache is designed to reduce collisions between load and store instructions. When a processor issues a store instruction, the store instruction causes a processor to write an operand to a memory address in main memory. Prior to writing the operand to the main memory, the operand is stored in an entry in a store forwarding cache if a load instruction is issued to operate on the operand prior to the store instruction completing. The operand being the data that a processor will operate upon pursuant to an instruction. To hinder the store instruction from causing a processor to write the operand to main memory prior to the processor operating on the operand pursuant to the load instruction, a dependency is created between the load instruction and the store instruction. The location of the operand in the store forwarding cache is dependent on the memory address in main memory that the operand will be stored.

However, in out-of-order processing a second store instruction is often issued for the same memory address in main memory. If a processor executes the second store instruction prior to completion of the load instruction, the second store instruction will overwrite the operand in the store forwarding cache. Consequently, the execution of the load instruction is delayed because the operand is not retrieved from the store forwarding cache and the initial store instruction has to be completed prior to receiving the operand.

Turning now to an overview of the aspects of the invention, one or more embodiments of the invention address the above-described shortcomings of the prior art by creating dependencies between stores to improve store forwarding efficiencies. A processor writes operand address information of incoming store instruction into a dispatch store table (DST). The processor also monitors incoming load instructions and compares the operand address of each load instruction to the entries in the DST If the operand address information of the load instruction matches the operand address information for an entry in the DST, the processor creates a dependency between the load instruction and the youngest matching store instruction. The dependency helps reduce the number of store hit load (SHL) and load hit store (LHS) collisions. SHL collisions occur when a store instruction instructs a processor to store data to an address after the data has been loaded from the address by a store instruction. LHS collisions occur when a load instruction instructs a processor to load data from an address before the data has been stored to the address by a store instruction.

The processor also compares the operand address information of each incoming store instruction to the operand address information of store instructions loaded onto the DST. If the operand address information of the store instruction matches the operand address information for an entry in the DST, the processor creates a dependency between the incoming store instruction and the store instruction previously loaded onto the DST. This dependency helps reduce the number of store forwarding cache collisions by hindering a second store instruction from overwriting the store forwarding cache prior to completion of the load instruction.

Turning now to a more detailed description of aspects of the present invention, FIG. 1 depicts a block diagram of an instruction pipeline having delay logic 100, according to one or more embodiments of the present invention. Delay logic 100 functions as an instruction dispatch unit (IDU) (which includes DST 106 and a decode logic 108) and an instruction sequencing unit (ISU) (which includes invalidate logic 110 and a register mapper 112), according to one or more embodiments of the present invention. In some embodiments, the DST 106 includes an array of latches. The IDU and ISU maintain parallel tables: one table includes the base, index, displacement and the address vector. The parallel table is implemented in instruction dependency matrix 116. Referring to FIG. 1, for the purposes of illustration, the instruction dependency matrix 116 is included with instruction queue 114. The instruction dependency matrix 116 holds the dependency information for each dependency identified by the IDU unit. In some embodiments, the IDU dispatches in order, identifying static operand store compare (SOSC) dependencies as instructions dispatch, while the ISU issues out of order using the scoreboard (which includes the SOSC dependencies reported by the IDU).

The delay logic 100 can include a system instruction queue 102, a dispatch store table (DST) 106, decode logic 108 configured to decode grouped instructions, a register mapper 112, and invalidate logic 110. The delay logic 100 can also include an issue queue 114.

In some embodiments, the instruction queue 102 provides grouped instructions 104 to both the DST 106 (described in greater detail with respect to FIG. 4) and the decode logic 108. The decode logic 108 evaluates the grouped instructions and sends the decoded information to the DST 106 and simultaneously sent to the register mapper 112. The decoded information can include data such as, for example, whether the instruction is a load, whether the instruction is a store, etc. Using the decoded information, the DST 106 determines whether it should look for a hit, write an entry, or invalidate an entry from the table using the information received by the decode logic 108.

After the decode logic 108 determines that a load does have a dependency to a store in the DST, the dependency information is sent to the invalidate logic 110 in the ISU. The DST logic on the IDU side is unable to invalidate a store that has a base or index register that has been written in the same cycle as the load. The register mapper 112 calculates its own register dependency information (to avoid overwriting mapped, physical registers) that it subsequently forwards to the invalidate logic, since this same information is needed to determine if an SOSC hit should be honored. If the DST 106 reports an overlap between load and a store in the DST, and during that same cycle, the base or index register that has been written by an older instruction, that dependency will be invalidated, and will not reach the instruction dependency matrix 116.

If the dependency information passes through invalidate logic 110 without being invalidated, then the present dependency information registers on the instruction dependency matrix 116. Accordingly, instruction dependency matrix 116 keeps track of all dependencies in the issue queue including the present dependency. Once the dependency is resolved, then the issue queue 114 knows it can issue this load.

Figure 2:
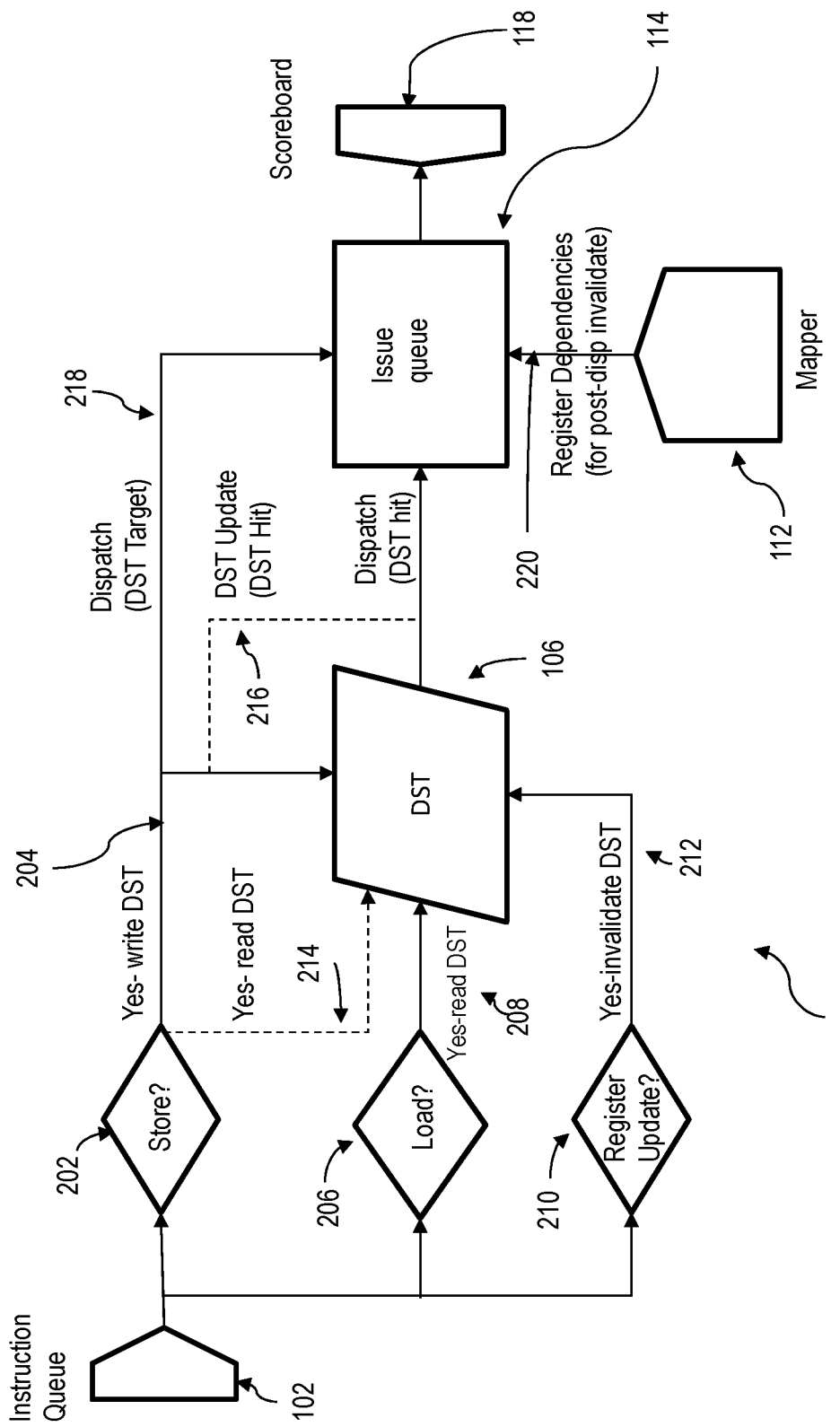
FIG. 2 depicts a block diagram illustrating a flow of load and store instructions through an instruction pipeline, according to one or more embodiments of the present invention.

FIG. 2 is a block diagram of a process 200 between elements of an instruction pipeline for improving store forwarding cache efficiency. An instruction queue 102 provides grouped instructions to a DST 106. A processor (not shown) monitors information from information text (itext) in a data stream. The processor identifies and differentiates the store instructions from load instructions. If the instruction is a store instruction 202, the store instruction is written to the DST 106 as illustrated by path 204. The store instruction remains in the DST 106 until the store instruction is overwritten by a younger store instruction. In some embodiments, the DST has a circular queue structure. The processor determines an age of a store instruction based on its position along the circular queue. The front of the queue is the oldest store instruction and the back of the queue is the youngest store instruction. If, however, the instructions are load instructions 206, the processor compares the values of the base register, index, register, displacement register, and memory image of the load instruction to each entry in the DST 106 as illustrated by path 208. If these values match one or more of the values of the values of the base register, index, register, displacement register, and memory image of a store instruction in the DST 106, the processor creates a dependency between the load instructions and the youngest store instruction in the DST 106. In some embodiments of the present invention, the processor stores a scoreboarding bit at scoreboard 118 and an indicator bit with the store instruction at the DST 106. The indicator bit provides an indication that the store instruction has a dependency with a load instruction and is a candidate for an additional dependency with another store instruction. In some embodiments, the store instruction is deemed an operand store compare (OSC) culprit and the load instruction is deeded an OSC victim. The processor using the decode information can also determine to invalidate an entry 210 from the DST 106. In some instances, a store invalidation 212 occurs when a system predicts that an operand will be available for an instruction execution, but is unavailable when the processor attempts to operate on the operand. In other instances, a store invalidation 212 occurs due to a cache miss and in other instances a store invalidation 212 occurs due to an incorrect branch prediction.

The processor also compares incoming store instructions with store instructions loaded on the DST 106 as illustrated by path 214. To accomplish this, the processor compares the values of the base register, index register, displacement register, and memory image of an incoming store instruction with the values of the base register, index register, displacement register, and memory image of each store instruction in the DST 106. In some embodiments, the processor only checks the store instructions that include the indicator bit. In other embodiments, the processor checks all the store instructions in DST 106. If the processor detects a match or hit with a previously written store instruction, the processor updates the DST 106, the scoreboard 118 and creates a dependency between the incoming store instruction and the previously loaded store instruction and dispatches the store instructions to the issue queue 216. By creating a dependency between the initial store instruction in the DST and the subsequent store instruction in the incoming stream, the subsequent store instruction is hindered from issuing prior to load instruction completing and the subsequent store instruction overwriting the initial store instruction in the store forwarding cache (not shown). Store instructions that are written to the DST 106 are dispatched to the issue queue 114 as illustrated by path 218. The load instructions are sent to the issue queue 114. The mapper 112 transmits dependency information to the issue queue 114 as illustrated by path 220.

Figure 3:
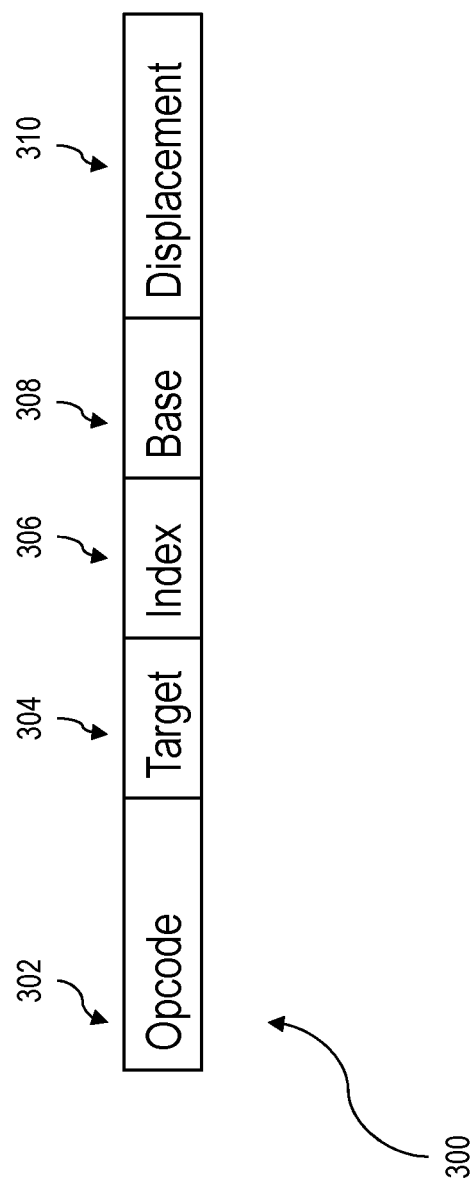
FIG. 3 depicts an instruction according to one or more embodiments of the present invention.

FIG. 3 depicts an instruction address 300, according to one or more embodiments of the present invention. In some aspects, instruction address 300 includes an opcode 302, a base register 308, an index register 306, a displacement register 310 and the target register 304.

Figure 4:
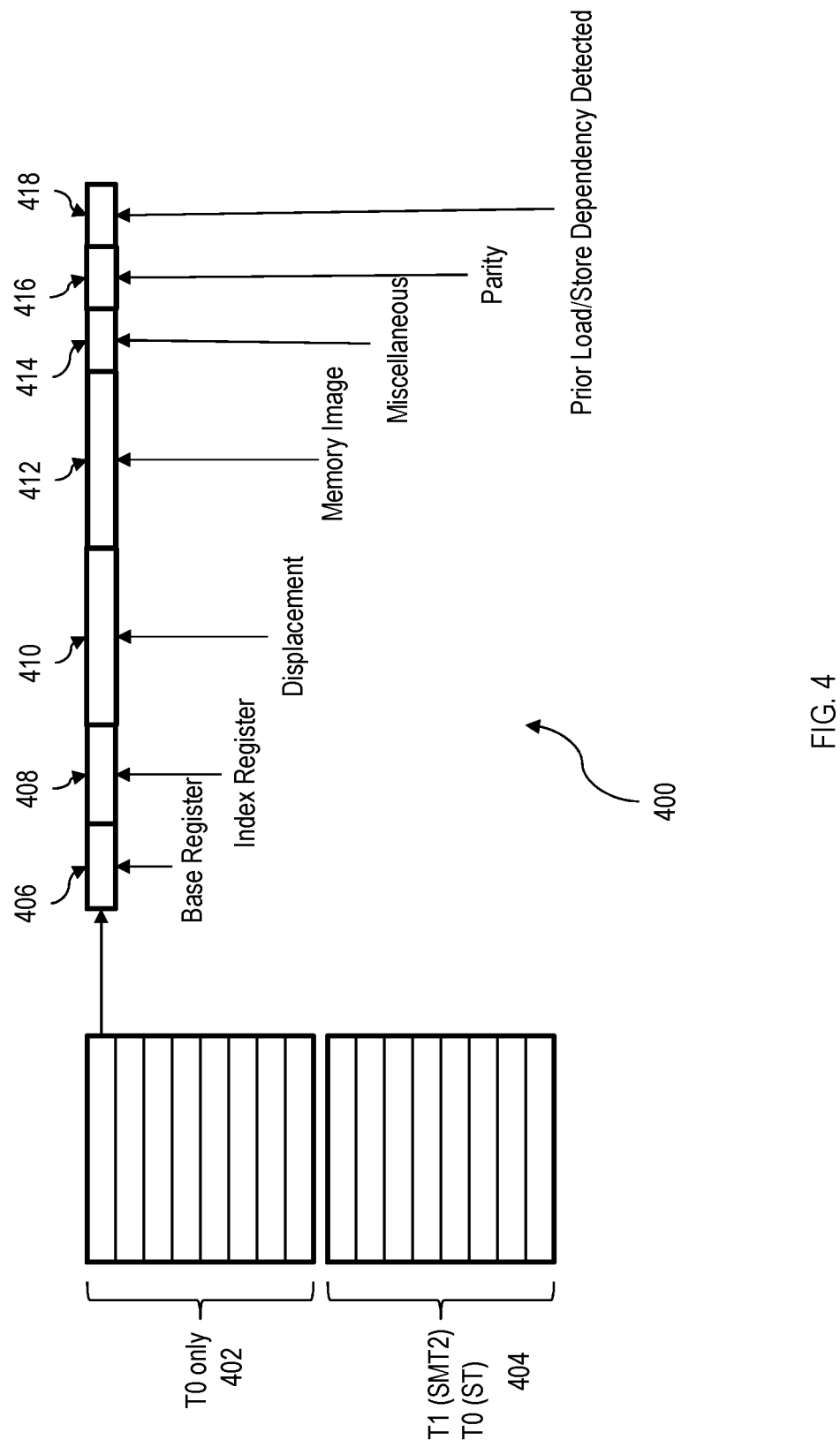
FIG. 4 depicts a dispatch store table (DST) structure according to one or more embodiments of the present invention.

FIG. 4 depicts a DST structure 400, according to one or more embodiments of the present invention. DST structure 400 may be statically partitioned per thread. For example, in SMT2 (Simultaneous Multi-Threading) mode, each thread in DST structure 400 may use 8 entries, depicted as thread 404. In single thread mode, all 16 entries (both 802 and 804) are used for thread 0. Each entry includes a base register 406, an index register 408, a displacement 410, a memory image 412, miscellaneous bits 414, parity bits 416, and an indicator bit 418. For address computation for locations in storage, the execution unit generates the starting address by taking a sum of the contents of the base register 406 plus the sum of contents of index register 408, plus displacement 410. The delay logic never knows the actual starting address, only where an address generator (AGEN) will get the information it needs to determine the starting address. The full address computation is not done until later in the pipeline (specifically, in the execution unit). The indicator bit 418 indicates that the store instruction is a candidate for a store instruction to store instruction dependency.

Figure 5:
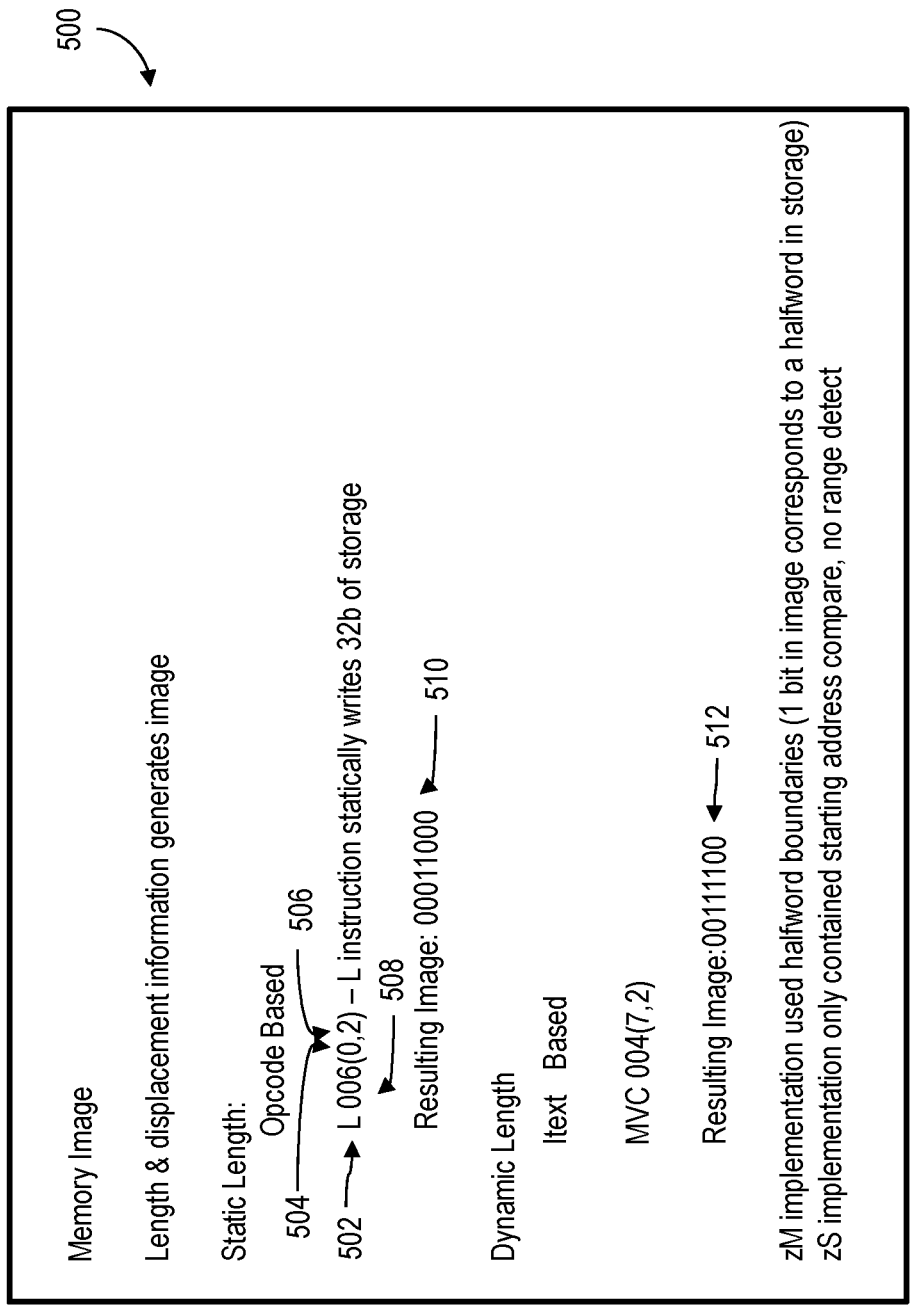
FIG. 5 depicts a memory image according to one or more embodiments of the present invention.

Some operations have a static length, such as a basic load which always writes 4 bytes of data. As shown in FIG. 5, load "L" 502 is shown having a base of 0 and an index of 2, (506 and 508, respectively). Displacement 508 is shown as 006 in the example of FIG. 5. To calculate a starting address, the execution unit adds the contents of the base register and index register to displacement 508 which is a displacement of 6 in the present example.

In the example of FIG. 5, delay logic 100 implements memory image 500 on quadword boundaries with each bit representing a half word. Accordingly, for embodiments of the present invention using a quadword, there are 8 half words in the vector. According to one or more embodiments of the present invention, delay logic 100 determines the vector using the lower 4 bits of displacement 508 (shown as 006). In this embodiment, where each bit in the vector represents a half word, the last bit of the displacement is not needed for the vector determination. Accordingly, delay logic 100 drops the last bit of that 6, and only uses bits 8, 9, and 10, which in the present example are 011 binary (or a 3 in base 10) of displacement 710. This load writes two half words worth of data, so from bit 3 delay logic 100 drives two bits to 1's. The resulting memory image 510 is 00011000.

There may also be instances of operations that are not static that have dynamic lengths, but many of those can be determined from the instruction text (itext). Consider a move character (MVC) function. This function has a base of 2 and a displacement of 4. The load 0 represents an index register, and the 7 represents the length of the operation. Based on this itext, delay logic 500 performs the same operation as done with the load. Delay logic 500 can identify bits 8 to 10 of the displacement, which in the present example are a 2. Delay logic 500 identifies bit 2 of our memory image and makes that location the starting point to drive 1s on the memory image. The number of 1s to write to memory is based on the length of the operation. Here the length is 7, which is 8 bytes worth of data (4 half words). Accordingly, delay logic 500 drive is on the next 4 bits of this memory image, which results in resulting image 512 (00111100). If the load in the present example had followed this MVC, the base matches, the load would not have used an index (which is a match as well), and bits 0 through 7 of the displacement would match.

Now delay logic 100 may compare the memory images, according to one or more embodiments of the present invention. Delay logic 100 may query vectors 510 and 512 and cause memory image 500 to perform a bitwise AND operation. In the present example, this operation gives a result of 00011000 (same as the load image). This means that there is an overlap between this MVC and this load where the system is storing and loading from. Delay logic 100 may then perform a bitwise OR operation on all bits of resulting vector, and if the result of the OR operation is a 1, delay logic 100 determines that there was overlap. Any instance of an overlap (determined by the base/index/displacement compare and memory image check) between these two instructions is reported to instruction dependency matrix 114.

It should be appreciated that, although embodiments of the memory image are described using a quadword of memory with half-word granularity, those skilled in the art appreciate that each vector/bit FIG. 6 depicts a flow diagram of a method 600 for creating a dependency between a store instruction stored in the DST 106 and a subsequent store instruction sharing a common instruction address according to one or more embodiments of the invention. At block 602 a processor detects a load instruction in an instruction stream that is subsequent to a store instruction held in the DST. The load instruction and the store instruction contain itext, which includes operand address information. The processor compares the values of the base register, the index register, the displacement register, and the memory image of the load instruction to the values of the base register, the index register, the displacement register, and the memory image of each store instruction held in the DST at block 604. This enables the processor to determine if there is match and/or a memory overlap at the issue queue between the load instruction and the store instruction.

In some embodiments, comparing the operand address information includes identifying a vector of the memory image. In some embodiments of the present invention, the processor determines a displacement of the load instruction and a bit length of the load instruction. The processor also identifies a store vector of the memory image by determining a displacement value of the store instruction and a bit length of the store instruction. The processor is also equipped to compare this operand address information of the load and store instructions.

When the processor detects a hit (a memory overlap), the processor, in response to the store instruction, sets a scoreboarding bit at the scoreboard and an indicator bit at the store instruction in the DST at block 606. The indicator bit is also known as an operand store compare (OSC) culprit bit. Prior to issuance of the load instruction, the scoreboard is checked for the presence of a scoreboarding bit and the load instruction does not issue until the load instruction is made dependent on the store instruction. In some embodiments, the indicator bit is set at the youngest matching store instruction in the DST. In other embodiments, the indicator bit is set at a predetermined matching store instruction in the DST.

The processor continues to monitor subsequent store instructions from the incoming instruction stream and compares the values of the base, index, and displacements registers, and memory images of the subsequent store instructions with each store instruction in the DST that holds an indicator bit at block 608. If a match is detected between a subsequent store instruction and a previously loaded store instruction in the DST, a scoreboarding bit is set at the scoreboard. Prior to issuance of the subsequent store instruction, the processor checks the scoreboard bit set in response to the matching store instruction in the DST. The subsequent store instruction is not issued until a dependency is created between the subsequent store instruction and the matching store instruction in the DST at block 610. In some embodiments, the matching store instruction in the DST is the above referenced youngest matching store instruction in the DST.

In some embodiments, the processor delays the subsequent store instruction in the pipeline in response to determining that there is a memory image overlap. In some embodiments, the processor dynamically inserts a number of clock cycles between an issue of the subsequent store instruction and the initial store instruction to establish delay period.

Additional processes may also be included. It should be understood that the processes depicted in FIG. 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for creating a store instruction dependency in a processor pipeline comprising:
    detecting, by a processor, a second store instruction subsequent to a first store instruction in an instruction stream, wherein the first store instruction and the second store instruction respectively include operand address information, and wherein there is a memory image overlap in an issue queue between the operand address information of the first store instruction and operand address information of a load instruction;

comparing, by the processor, the operand address information of the first store instruction with the operand address information of the second store instruction to determine whether there is a match between the operand address information of the second store instruction and the operand address information of the first store instruction; and writing, by the processor, a scoreboard bit to a scoreboard in response to determining a match between the operand address information of the second store instruction and the operand address information of the first store instruction;

analyzing, by the processor and prior to issuance of the second store instruction, the scoreboard to detect a determined match between the operand address information of the second store instruction and the operand address information of the first store instruction; and delaying, by the processor, the second store instruction in the processor pipeline until a dependency is created between the second store instruction and the first store instruction, wherein comparing the operand address information of the first store instruction with the operand address information of the second store instruction comprises:

translating a vector representing a base register address, an index register address, a displacement register address to a memory image vector for the first store instruction, translating a vector representing a base register address, an index register address, a displacement register address to a memory image vector for the second store instruction, and comparing the memory image vector for the first store instruction to the memory image vector for the second store instruction.

2. The computer-implemented method of claim 1, wherein the first store instruction is stored in a dispatch store table (DST).

3. The computer-implemented method of claim 1, wherein the first store instruction is the youngest store instruction in a dispatch store table (DST).

4. The computer-implemented method of claim 3, wherein an indicator bit is stored with the first store instruction in the DST.

5. The computer-implemented method of claim 4, wherein comparing the operand address information of the first store instruction with the operand address information of the second store instruction is based on a presence of the indicator bit.

6. The computer-implemented method of claim 1, wherein delaying the second store instruction comprises dynamically inserting a number of clock cycles between issue of the second store instruction and issue of the first store instruction.

7. A system for creating a store instruction dependency in a processor pipeline, the system comprising:
a processor communicatively coupled to a memory, the processor configured to:
detect a second store instruction subsequent to a first store instruction in an instruction stream, wherein the first store instruction and the second store instruction respectively include operand address information, and wherein there is a memory image overlap in an issue queue between the operand address information of the first store instruction and operand address information of a load instruction;

compare the operand address information of the first store instruction with the operand address information of the second store instruction to determine whether there is a match between the operand address information of the second store instruction and the operand address information of the first store instruction;

write a scoreboard bit to a scoreboard in response to determining a match between the operand address information of the second store instruction and the operand address information of the first store instruction;

analyze, prior to issuance of the second store instruction, the scoreboard to detect a determined match between the operand address information of the second store instruction and the operand address information of the first store instruction; and delay the second store instruction in the processor pipeline until a dependency is created between the second store instruction and the first store instruction, wherein comparing the operand address information of the first store instruction with the operand address information of the second store instruction comprises:

translating a vector representing a base register address, an index register address, a displacement register address to a memory image vector for the first store instruction, translating a vector representing a base register address, an index register address, a displacement register address to a memory image vector for the second store instruction, and comparing the memory image vector for the first store instruction to the memory image vector for the second store instruction.

8. The system of claim 7, wherein the first store instruction is stored in a dispatch store table (DST).

9. The system of claim 7, wherein the first store instruction is the youngest store instruction in a dispatch store table (DST).

10. The system of claim 9, wherein the processor is further configured to store an indicator bit with the first store instruction in the DST.

11. The system of claim 10, wherein comparing the operand address information of the first store instruction with the operand address information of the second store instruction is based on a presence of the indicator bit.

12. The system of claim 7, wherein delaying the second store instruction comprises dynamically inserting a number of clock cycles between issue of the second store instruction and issue the first store instruction.

13. A computer program product for creating a store instruction dependency in a processor pipeline, the computer product comprising a computer readable storage medium having program instructions embodied therewith, the instructions executable by a processor to cause the processor to:

detect a second store instruction subsequent to a first store instruction in an instruction stream, wherein the first store instruction and the second store instruction respectively include operand address information, and wherein there is a memory image overlap in an issue queue between the operand address information of the first store instruction and operand address information of a load instruction;

compare the operand address information of the first store instruction with the operand address information of the second store instruction to determine whether there is a match between the operand address information of the second store instruction and the operand address information of the first store instruction;

write a scoreboard bit to a scoreboard in response to determining a match between the operand address information of the second store instruction and the operand address information of the first store instruction;

analyze, prior to issuance of the second store instruction, the scoreboard to detect a determined match between the operand address information of the second store instruction and the operand address information of the first store instruction; and delay the second store instruction in the processor pipeline until a dependency is created between the second store instruction and the first store instruction, wherein comparing the operand address information of the first store instruction with the operand address information of the second store instruction comprises:

translating a vector representing a base register address, an index register address, a displacement register address to a memory image vector for the first store instruction, translating a vector representing a base register address, an index register address, a displacement register address to a memory image vector for the second store instruction, and comparing the memory image vector for the first store instruction to the memory image vector for the second store instruction.

14. The computer program product of claim 13, wherein the first store instruction is stored in a dispatch store table (DST).

15. The computer program product of claim 13, wherein the first store instruction is the youngest store instruction in a dispatch store table (DST).

16. The computer program product of claim 15, wherein the processor is further configured to store an indicator bit with the first store instruction in the DST.

17. The computer program product of claim 13, wherein delaying the second store instruction comprises dynamically inserting a number of clock cycles between issue of the second store instruction and the first store instruction.

* * * * *